(12) United States Patent
Nakano

(10) Patent No.: US 6,823,366 B1
(45) Date of Patent: Nov. 23, 2004

(54) CONTENT DELIVERY SYSTEM INCLUDING CONTENT DELIVERY CONFIRMATION DATA

(75) Inventor: Masahisa Nakano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 670 days.

(21) Appl. No.: 09/649,564

(22) Filed: Aug. 28, 2000

(30) Foreign Application Priority Data

Oct. 19, 1999 (JP) .......................................... 11-297174

(51) Int. Cl.[7] .............................................. G06F 13/00
(52) U.S. Cl. ........................ 709/206; 709/219; 719/329
(58) Field of Search ................................ 709/206, 217, 709/219, 223, 224, 328, 329; 719/328, 329

(56) References Cited

U.S. PATENT DOCUMENTS

| | | | |
|---|---|---|---|
| 5,793,973 A | * 8/1998 | Birdwell et al. | ............. 709/223 |
| 5,982,893 A | * 11/1999 | Hughes | ........................ 705/75 |
| 6,038,296 A | * 3/2000 | Brunson et al. | ........ 379/100.11 |
| 6,463,462 B1 | * 10/2002 | Smith et al. | ................. 709/206 |
| 6,477,243 B1 | * 11/2002 | Choksi et al. | ......... 379/100.06 |
| 6,654,892 B1 | * 11/2003 | Karim | ........................ 713/201 |

* cited by examiner

*Primary Examiner*—Viet D. Vu
(74) *Attorney, Agent, or Firm*—Greer, Burns & Crain, Ltd.

(57) ABSTRACT

A contents delivery system includes a client machine that executes a browser capable of requesting contents and a server machine that has a HDD for storing contents and executes WWW server capable of transmitting the contents requested by the client machine to the client machine. The server machine includes an ID issuance module for issuing a delivery confirmation ID that is uniquely related to the contents every time the contents are requested by the client machine, and a plug-in data creation part for creating plug-in data including the delivery conformation ID, client information and server information. The server machine further includes a application execution part for transmitting the plug-in data including the delivery confirmation ID related to the contents to the client machine through the WWW server, and a delivery confirmation receiving part for receiving delivery confirmation data containing the delivery confirmation ID and the client information which is sent from the client machine. The client machine executes a plug-in software creating the delivery confirmation data based upon the plug-in data and transmitting the delivery confirmation data to the delivery confirmation receiving part of the server machine in accordance with the server information contained in the plug-in data.

10 Claims, 14 Drawing Sheets

FIG.6

```
Start
  ↓
S101 Request and receive an HTML document
  ↓
S102 Analyze and display the HTML document
  ↓
S103 Is there an EMBED tag? ──NO──┐
  │YES                             │
S104 Request and receive the file   │
     specified by the EMBED tag     │
  ↓                                 │
S105 Activate plug-in software      │
     specified by the extension     │
     of the file                    │
  ↓←──────────────────────────────── ┘
End
```

FIG.7

```
<HTML>
  .
  .
  .
<BODY>
  .
  .
  .
<EMBED SRC= "foo. xxx" >
  .
  .
  .
</BODY>
</HTML>
```

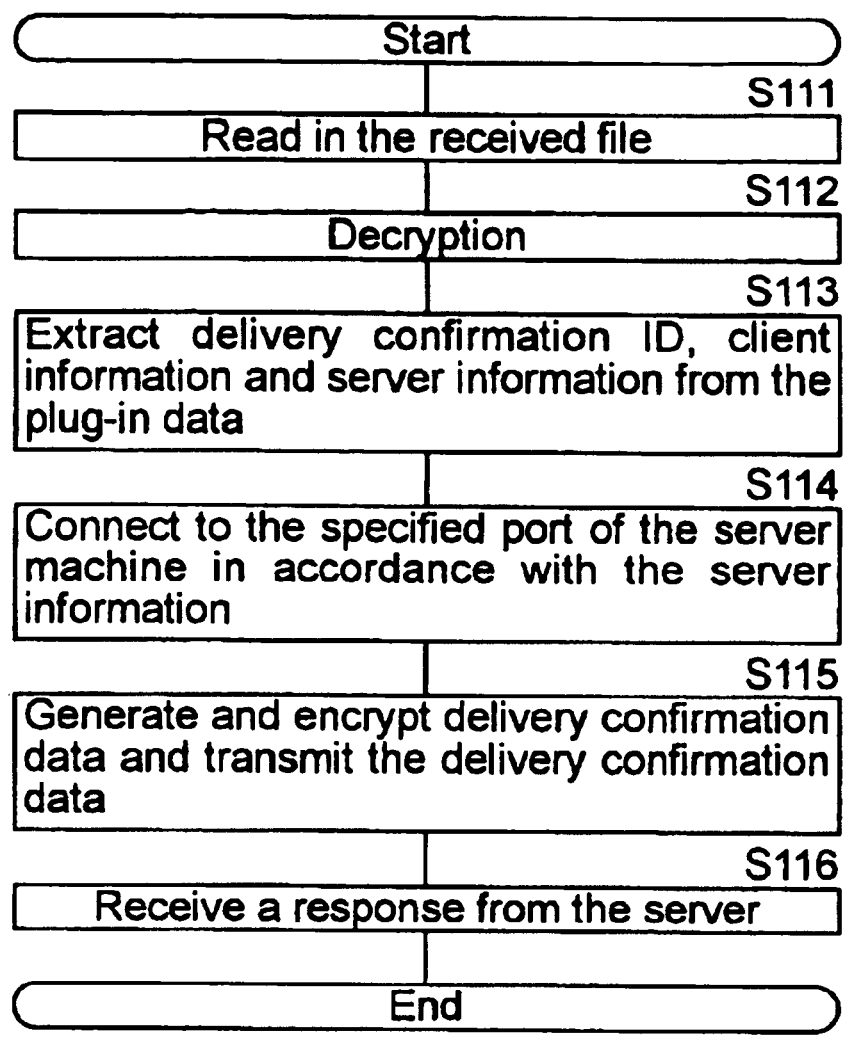

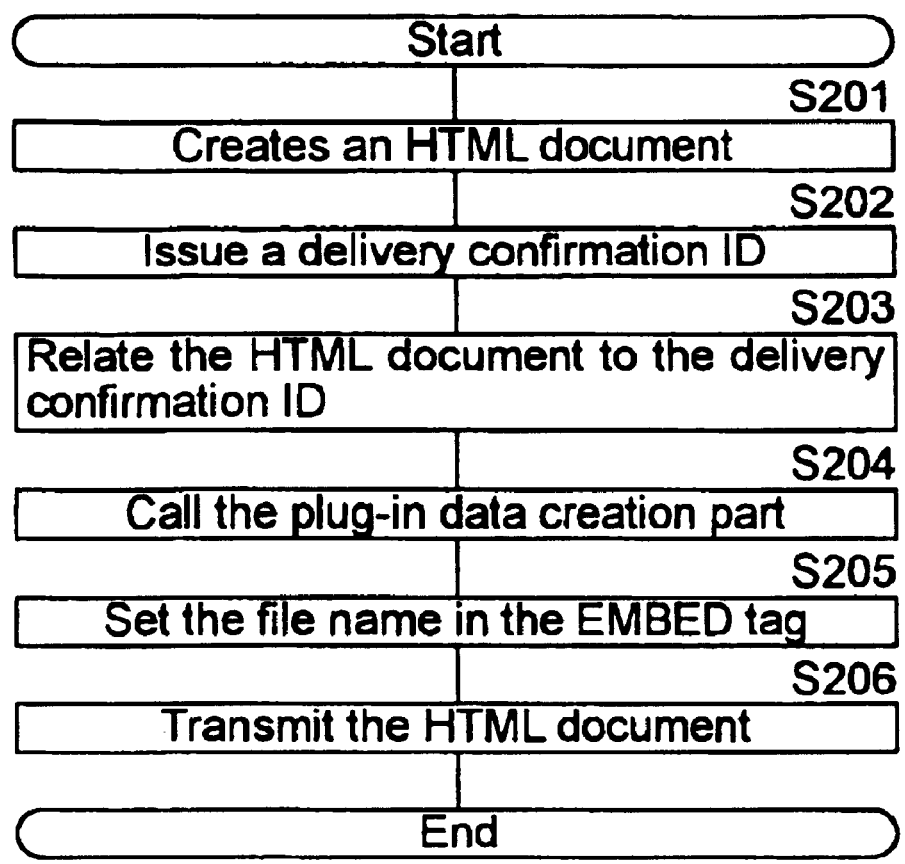

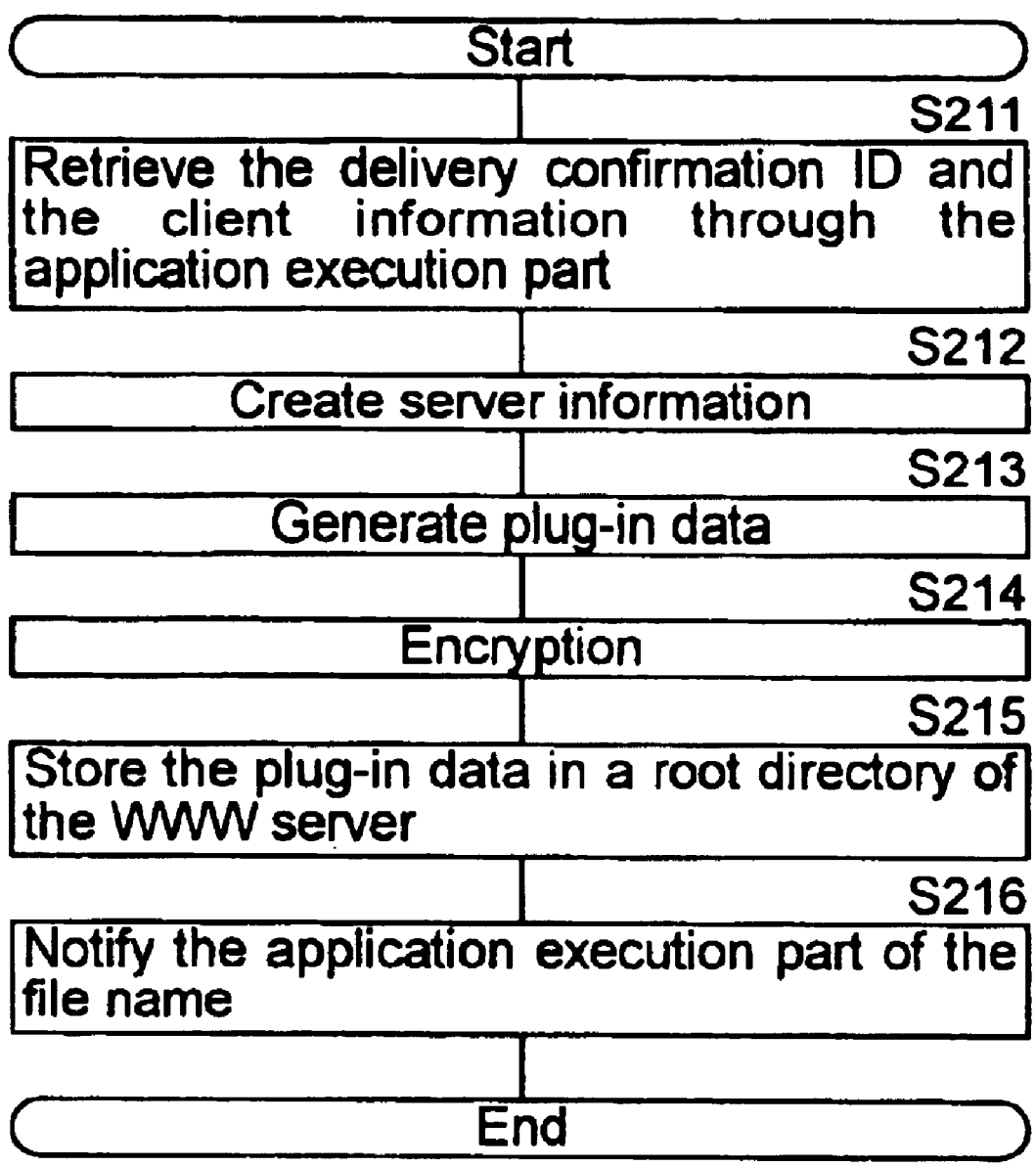

CONTENT DELIVERY SYSTEM INCLUDING CONTENT DELIVERY CONFIRMATION DATA

BACKGROUND OF THE INVENTION

1. Field of the Invention

This invention relates to a client machine and a server machine that are mutually connected to each other through a network, and a contents delivery system which can confirm whether contents transmitted from the server machine are received by the client machine. This invention also relates to computer readable mediums respectively containing programs which instruct the client machine and the server machine to function as the contents delivery system.

2. Description of the Related Art

A client machine, which executes a WWW (World Wide Web) browser program, can retrieve HTML documents provided by a server machine that executes a WWW server program while the client machine is connecting to the server machine through a network such as LAN or Internet.

The client machine notifies the server machine of a URL to request an HTML document specified by this URL. In response, the server machine sends out the requested HTML document corresponding to the URL to the client machine. Upon receiving the HTML document, the client machine displays the HTML document on a screen through its browser.

However, after sending out the HTML document to the client machine, the server machine can not confirm whether the HTML document has actually been received by the intended client machine without problems. In other words, even if the server machine has sent out an HTML document to the client machine without any errors, only the client machine can recognize it. In order for the server machine to verify a normal reception of an HTML document at the client machine, the user of the client machine needs to operate the client machine to send out data indicating the conformation of the receipt to the server machine.

Thus, according to the above-mentioned conventional art, in order to confirm a data reception at the client machine side, the server machine had to rely on a manual operation by the user at the client machine. Accordingly, even when the data is received by the client machine successfully, the server could not confirm that the data were successfully received unless the user (receiver) notifies the server machine of the reception by performing an appropriate operation on the client machine. This procedure of confirmation is extra for the user. Thus, the convention art wants a simple and operable delivery confirmation system for data transmission.

SUMMARY OF THE INVENTION

To obviate the above-mentioned drawbacks in the conventional art, an object of the present invention is to provide a contents delivery system that enables a server machine to confirm whether contents sent from a server are successfully received by a client machine.

To achieve the above-mentioned object, the present invention provides the following construction.

A contents delivery system according to the present invention is equipped with a client machine that executes a client program capable of requesting delivery of contents and a server machine that has a storage for storing contents and executes a server program capable of transmitting the contents requested by the client machine to the client machine.

The server machine further includes an ID issuance part for issuing a delivery confirmation ID that is uniquely related to the contents requested by the client machine every time contents are requested by the client machine, a plug-in data creation part for creating plug-in data including the delivery conformation ID, client information which uniquely specifies the client machine and server information uniquely specifies the server machine, a plug-in data transmission part for transmitting the plug-in data including the delivery confirmation ID related to the contents that have been transmitted to the client machine by the server program, and a delivery confirmation receiving part for receiving delivery confirmation data. The client machine includes a delivery confirmation transmission part creating delivery confirmation data that include the delivery confirmation ID and the client information based upon the plug-in data including the delivery confirmation ID related to the contents that have been sent from the server program of the server machine and have been received by the client program, and transmitting the delivery confirmation data to the delivery confirmation receiving part of the server machine in accordance with the server information contained in the plug-in data.

With this construction, the server machine instructs the ID issuance part to issue a delivery confirmation ID corresponding to the contents when the server machine receives a request from the client machine to deliver the corresponding contents. The plug-in data creation part of the server machine then creates plug-in data including the delivery conformation ID, client information and server information. The client machine acquires the contents and the plug-in data, and instructs its delivery confirmation transmission part to create delivery confirmation data including the delivery confirmation ID and the client information that are included in the plug-in data. The client machine then transmits the delivery confirmation data to the delivery confirmation receiving part of the server machine through the delivery confirmation transmission part. Accordingly, the server machine can confirm that the contents related to the delivery confirmation ID have been received by the intended client machine by acquiring the delivery confirmation ID in the delivery confirmation data received by its delivery confirmation receiving part.

BREIF DESCRIPTION OF THE DRAWINGS

The invention will be described below in detail with reference to the accompanying drawings, in which.

Figure 4:
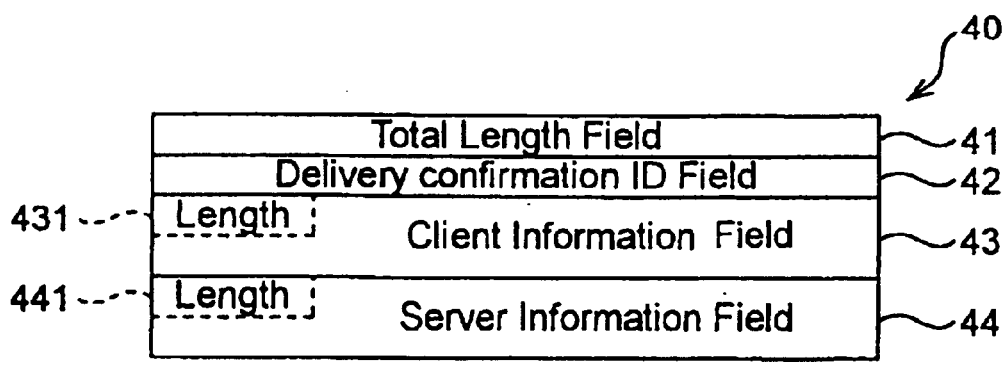
Figure 5:
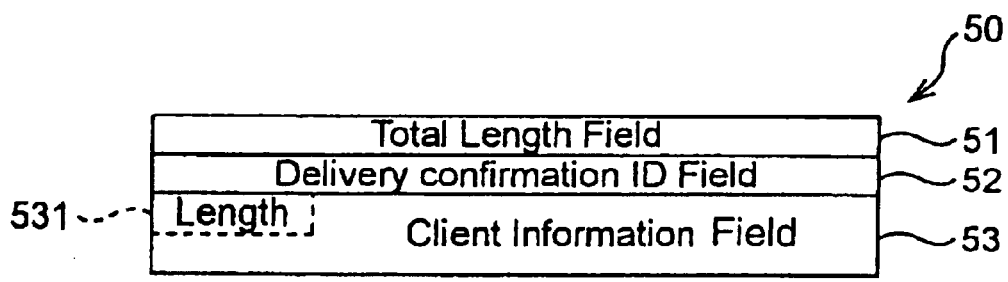
Figure 11:
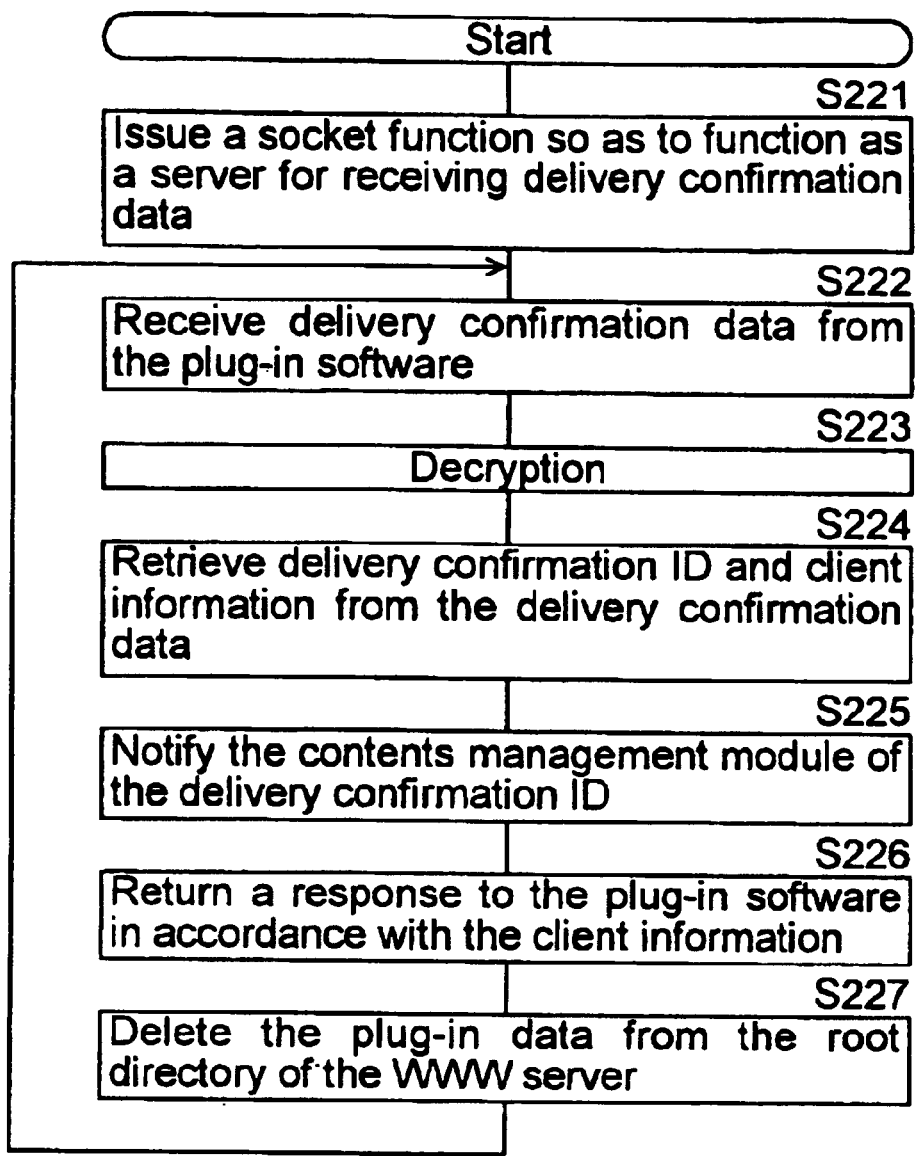
Figure 12:
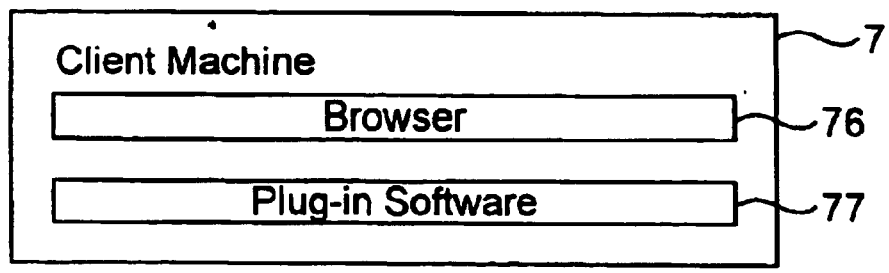
Figure 13:
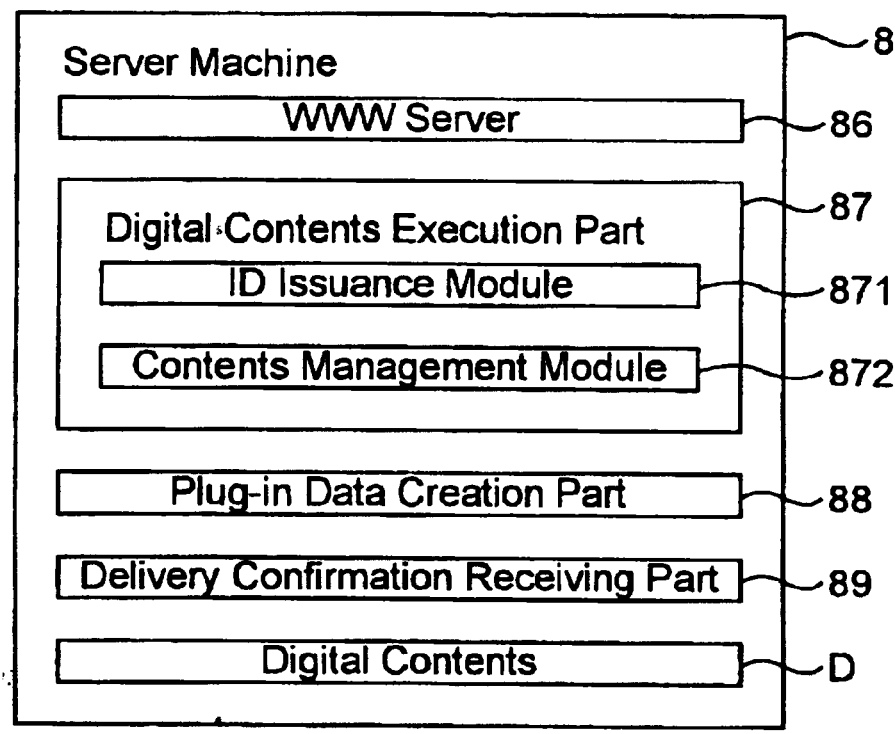
Figure 14:
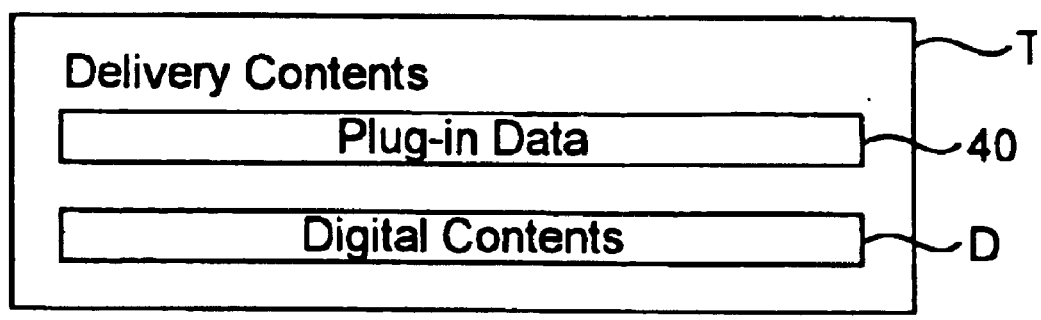
Figure 15:
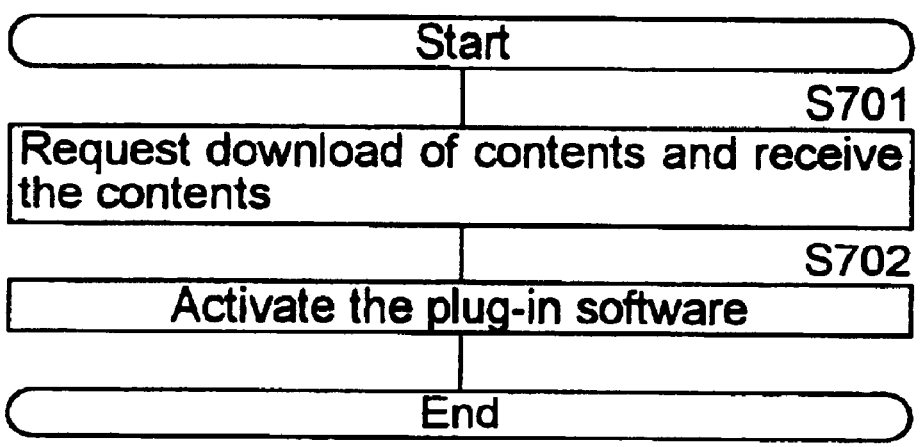
Figure 16:
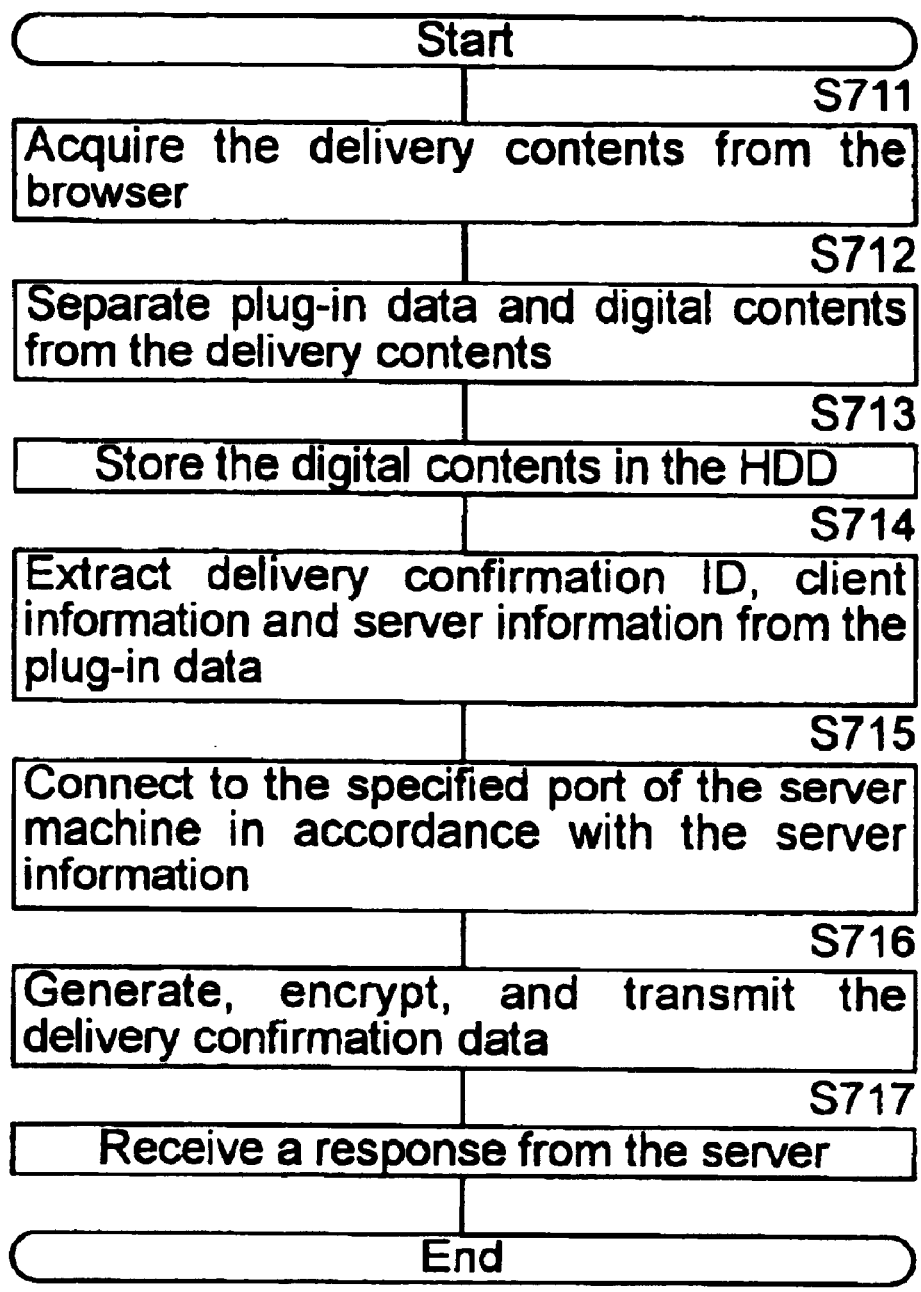
Figure 17:
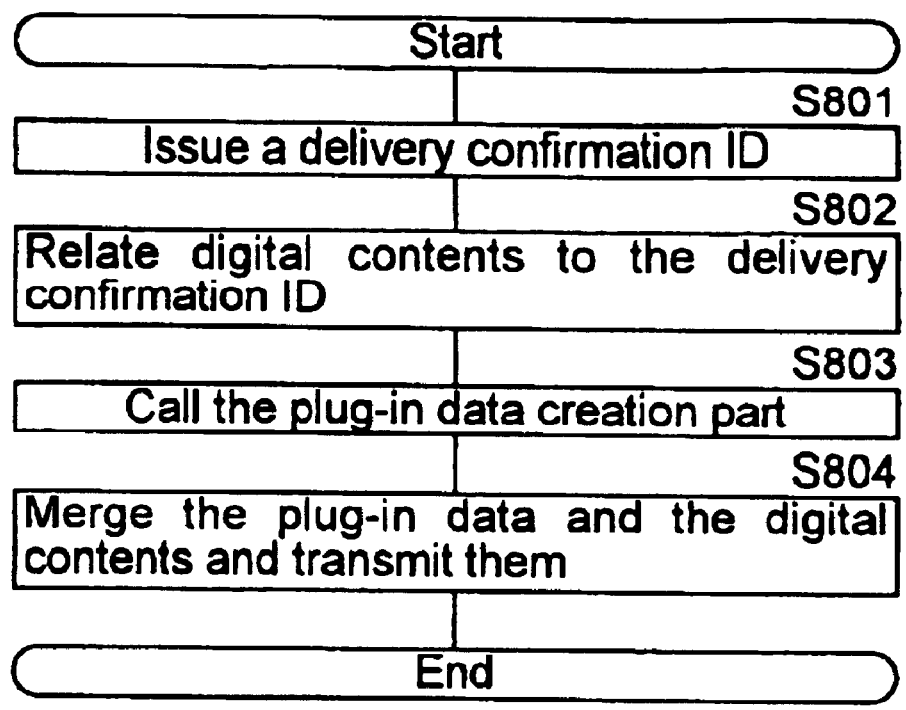
Figure 18:
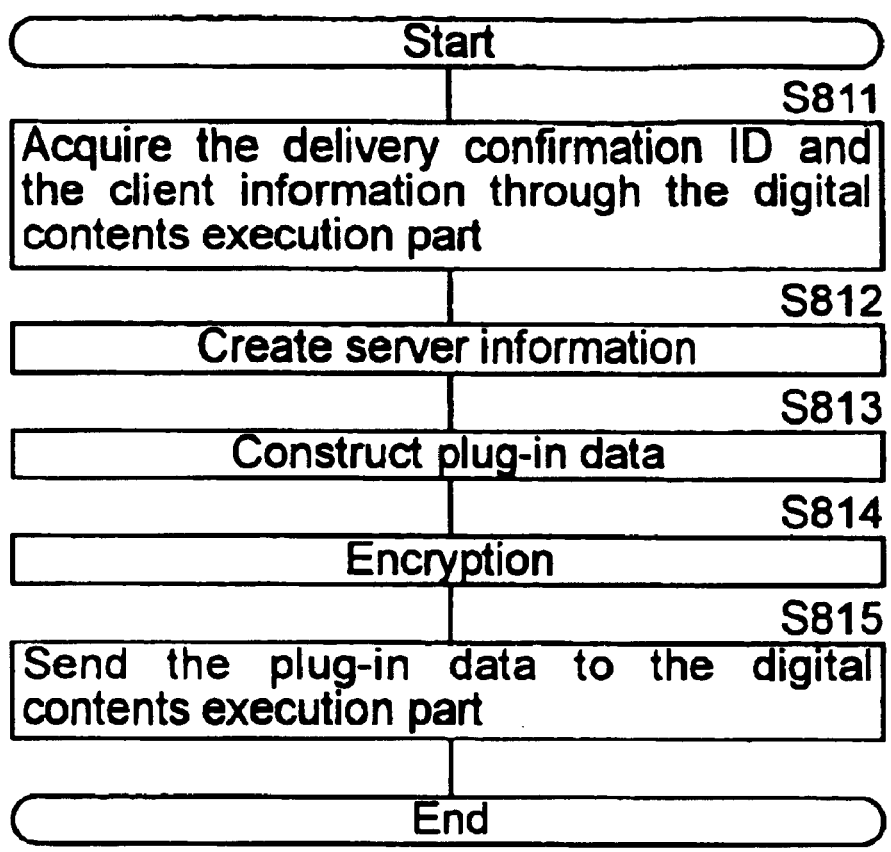
Figure 19:
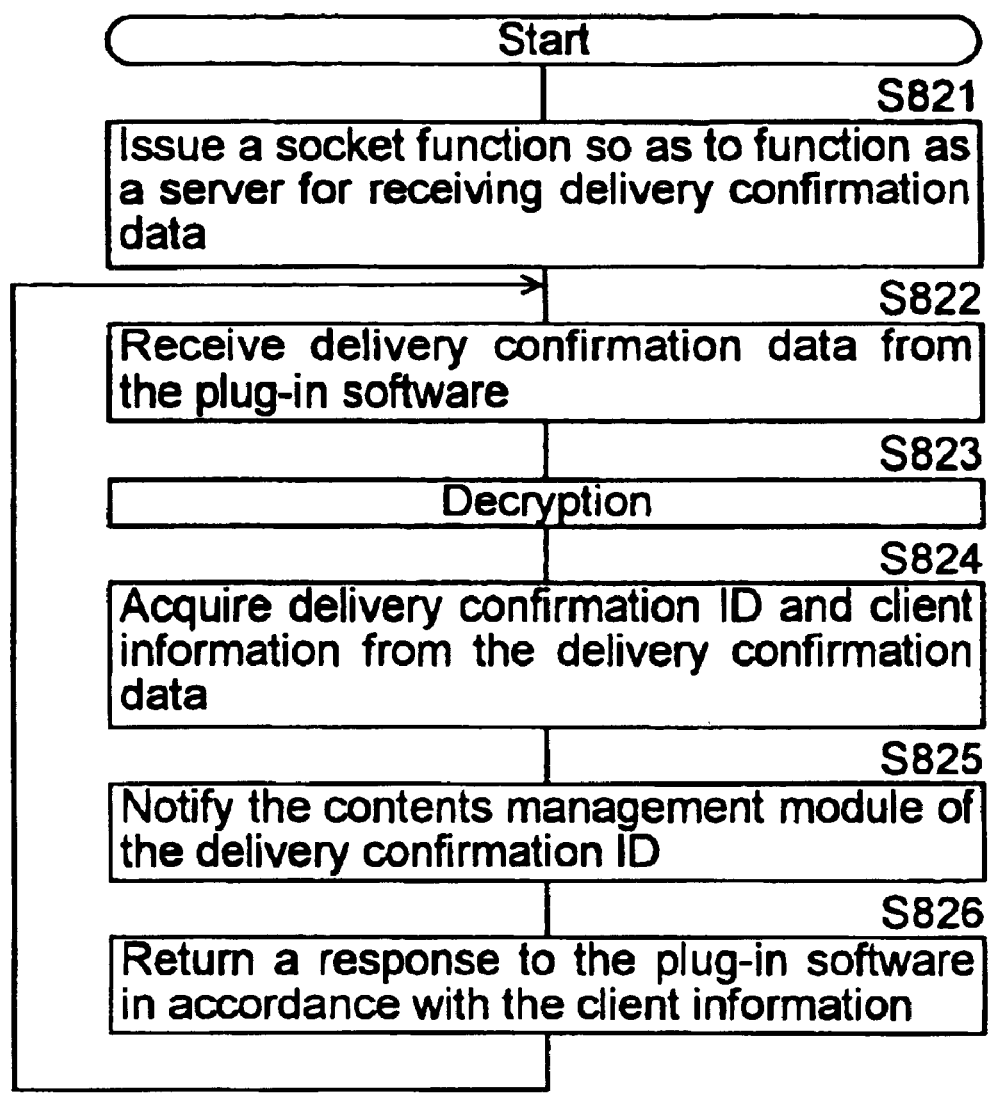

FIG. 4 schematically shows a data format of plug-in data;

FIG. 5 schematically shows a data format of delivery confirmation data;

FIG. 6 is a flow chart showing process based on a browser in the first embodiment;

FIG. 7 schematically shows an example of an HTML document;

FIG. 8 is a flow chart showing process based on plug-in software in the first embodiment;

FIG. 9 is a flow chart showing process executed by an application execution part in the first embodiment;

FIG. 10 is a flow chart showing process executed by a plug-in data creation part in the first embodiment;

FIG. 11 is a flow chart showing process executed by an delivery confirmation receiving part in the first embodiment;

FIG. 12 is a block diagram showing a software configuration in a client machine according to a second embodiment;

FIG. 13 is a block diagram showing software configuration in a server machine in the second embodiment;

FIG. 14 shows a schematic view of delivery contents;

FIG. 15 is a flow chart showing process executed by a browser in the second embodiment;

FIG. 16 is a flow chart showing process executed by plug-in software in the second embodiment;

FIG. 17 is a flow chart showing process executed by a digital contents execution part in the second preferred embodiment;

FIG. 18 is a flow chart showing process executed by a plug-in data creation part in the second preferred embodiment; and FIG. 19 is a flow chart showing process executed by a delivery confirmation receiving part in the second embodiment.

DESCRIPTION OF THE PREFERRED EMBODIMENTS

The preferred embodiments of the present invention will now be described in detail below with reference to the accompanying drawings.

First Preferred Embodiment

Figure 1:
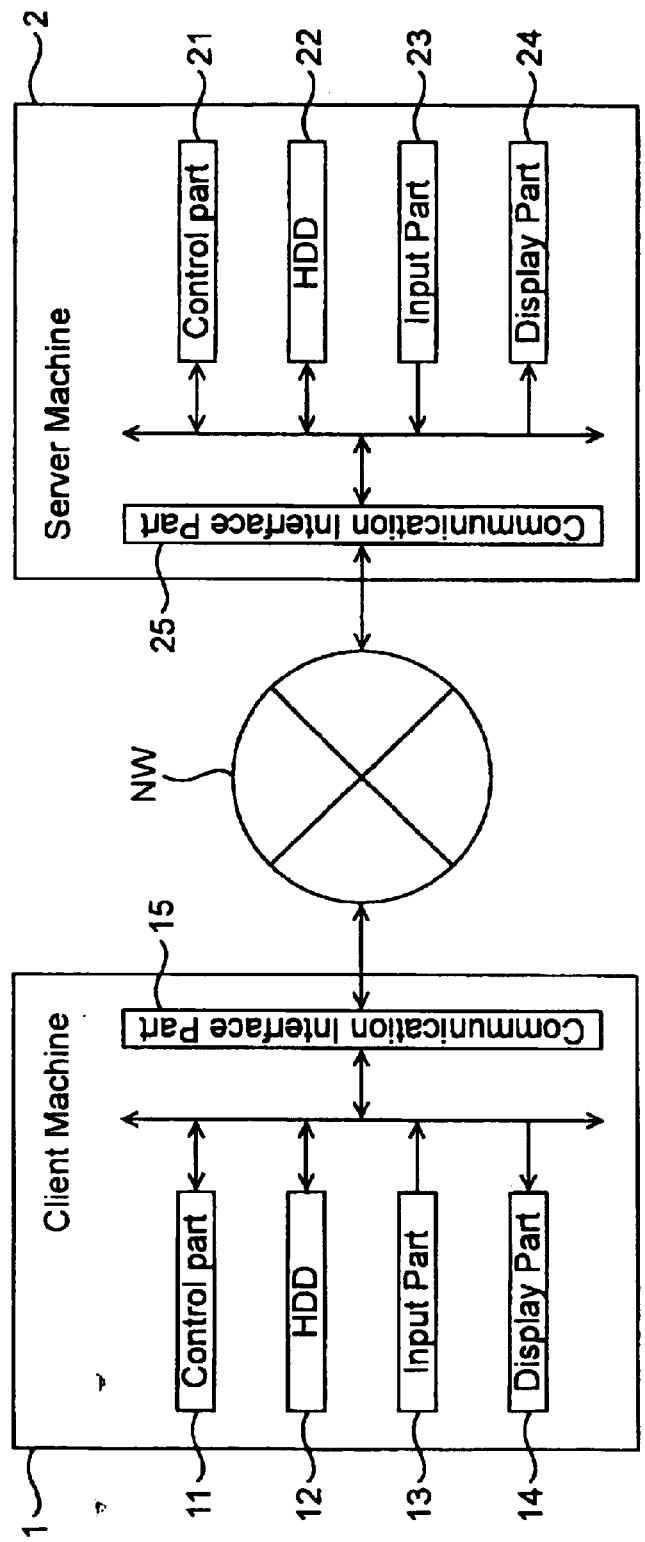
FIG. 1 is a block diagram showing a hardware configuration of a first embodiment.

FIG. 1 is a hardware configuration of the first embodiment of present invention. As shown in FIG. 1, a client machine 1 and a server machine 2 are connected through a network NW, such as a LAN, Internet, or the like. The client machine 1 and the server machine 2 are constructed of a general-purpose computer, such as a personal computer or a workstation, respectively.

That is, as shown in the figure, the client machine 1 is equipped with a control part 11, an HDD 12, an input part 13, a display part 14, and a communication interface part 15, which are mutually connected through a bus. The control part 11 has a CPU and a memory, which are not shown in the drawings. The HDD 12 is a computer readable medium. This HDD 12 can store data in its storage area. Software, such as a program to be executed by control part 11, is pre-installed in the storage area. The control part 11 controls each part of the client machine 1, by functioning in accordance with the program stored in the HDD 12.

The input part 13 has a keyboard interface, and a keyboard and a mouse (not shown in the figures) which are connected through the keyboard interface to the bus. The display part 14 has a display control circuit having a VRAM, and a display screen such as a CRT or an LCD. The communication interface part 15 includes a network interface card (NIC). Also, the client machine 1 is connected to the network NW, such as a LAN or Internet, through the communication interface part 15 so that it can communicate with other computers connected to the network NW in accordance with the TCP/IP protocol.

On the other hand, the server machine 2 is equipped with a control part 21, an HDD 22 having a storage area as a computer readable medium, an input part 23, a display part 24, and a communication interface part 25, which are mutually connected through a bus. The server machine 2 has a structure similar to the client machine 1, and each constituent element is similar to that of the client machine 1. However, software stored in the HDD 22 of the server machine 2 is different from the software stored in the HDD 12 of the client machine 1.

Figure 2:
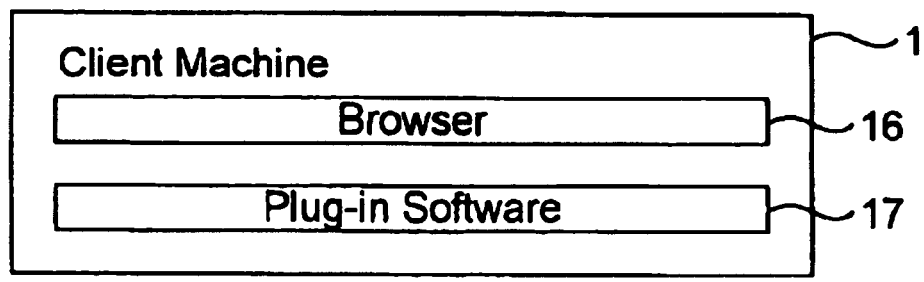
FIG. 2 is a block diagram showing a configuration of software in the client machine of first embodiment.

The software configuration of this preferred embodiment will now be explained in detail below. First, the software configuration of the client machine 1 is explained in detail with reference to FIG. 2. The software of the client machine 1 includes an operating system (Os) (not shown in the figure), a WWW browser program 16, which is executed on the OS (referred to as "browser" for simplicity hereinafter), and a plug-in software 17.

Based on the HTTP protocol operating on the TCP/IP protocol, the browser 16 can communicate with a WWW server 26 (which will be explained later) on the server machine 2. This browser 16 can perform the functions of requesting and receiving an HTML document specified by an URL that is designated by a user from the server machine 2, of displaying the received HTML document on the display part 14 of the client machine 1, of requesting and receiving plug-in data (which will be described later) from the server machine 2, and of executing the plug-in software 17.

The plug-in software 17 has the functions of reading the plug-in data received by the browser 16, of issuing a socket function for communicating with the server machine 2 in accordance with the TCP/IP protocol, of sending delivery confirmation data (which will be explained later) to the server machine 2 using this socket function and of receiving a response from the server machine 2. This plug-in software 17 corresponds to a delivery confirmation transmission part and a plug-in data decryption part.

Figure 3:
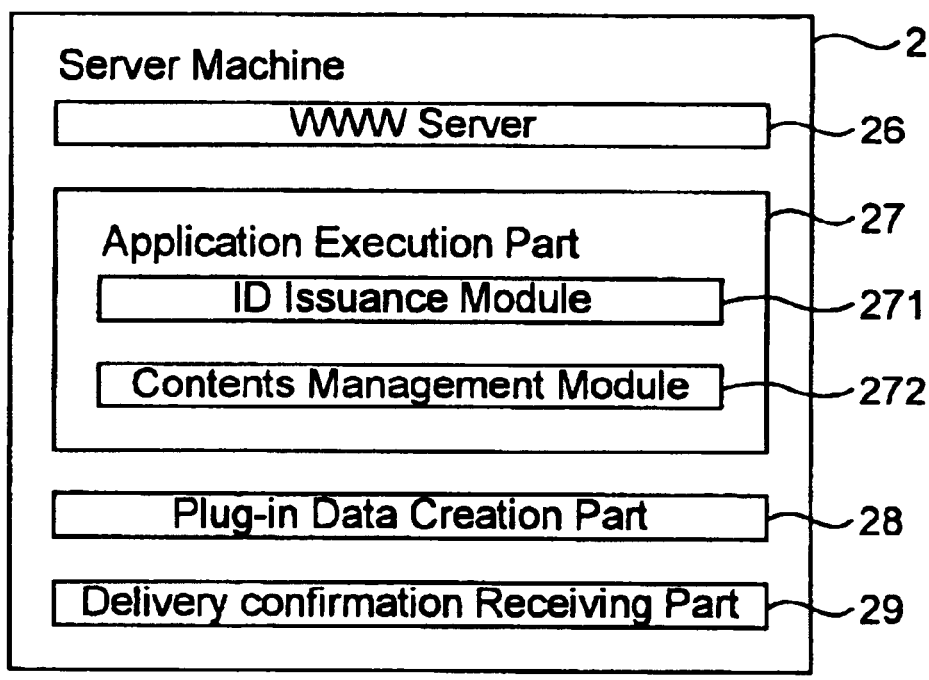
FIG. 3 is a block diagram showing a configuration of software in the server machine of first embodiment.

Next, a software configuration in the server machine 2 is explained with reference to FIG. 3. The software of the server machine 2 includes an OS (not shown in the figure), a WWW server program 26 to be executed on the OS (hereinafter, simply called as "WWW server"), an application execution part 27, a plug-in data creation part 28, and a delivery confirmation receiving part 29.

The WWW server 26 can communicate with browser 16 in the client machine 1 based on the HTTP protocol operating on the TCP/IP protocol.

The application execution part 27 is realized on the bases of CGI applications, for example, and has the function of generating HTML documents. The application execution part 27 has an ID issuance module 271 and a contents management module 272. The ID issuance module 271 issues a unique delivery confirmation ID to each HTML document created. The contents management module 272 manages delivery of the HTML documents. The application execution part 27 corresponds to the plug-in data transmission part.

The plug-in data creation part 28 creates plug-in data 40 (which will be explained in detail later) and encrypts the plug-in data 40. The delivery confirmation receiving part 29 has functions of issuing a socket function for communicating with the client machines 1 and receiving delivery confirmation data 50 (which will be explained later) using this socket function.

Next, the plug-in data 40 and the delivery confirmation data 50, which are transmitted between the client machine 1 and the server machine 2, are explained. FIG. 4 schematically shows a data format of the plug-in data 40. As shown in FIG. 4, the plug-in data 40 have a total length field 41, a delivery confirmation ID field 42, a client information field 43, and a server information field 44.

The total length field 41 is a region of 4 bytes, for example, and stores information (which is number of bytes) as to the total length of the plug-in data 40. The delivery confirmation ID field 42 is a region of 4 bytes, for example, and stores a delivery confirmation ID that is created by the ID issuance module 271 in the application execution part 27.

The client information field 43 stores an IP address of a client machine 1 as client information, and has an area 431 for storing information (which is number of bytes) as to the field length of itself. The server information field 44 stores server information. The server information includes an IP address of the server machine 2 and a port number of a port of the server machine 2 through which the delivery confirmation data 50 (which will be explained below) is received by the server machine 2. Also, the server information field 44 has a storage area 441 for storing its own field length (which is number of bytes).

The plug-in data 40 having such a data format are created by the plug-in data creation part 28 in the server machine 2. As explained in detail below, in response to a request from the browser 16 in the client machine 1, the WWW server 26 sends out the thus created plug-in data 40 to the browser 16 in the client machine 1. Upon receipt of the plug-in data 40 from the WWW server 26, the browser 16 in the client machine 1 activates the plug-in software 17. The thus activated plug-in software 17 acquires the plug-in data 40 from the browser 16, and creates delivery confirmation data 50 (which will be explained below) based on information extracted from the plug-in data 40. The plug-in software 17 then transmits the delivery confirmation data 50 to the delivery confirmation receiving part 29 in the server machine 2.

FIG. 5 shows a structure of a data format of the delivery confirmation data 50. As shown in FIG. 5, the delivery confirmation data 50 has a total length field 51, a delivery confirmation ID field 52, and a client information field 53.

The total length field 51 is a region of 4 bytes, for example, and stores the total length (which is a number of bytes) of the delivery confirmation data 50. The delivery confirmation ID field 52 is a region of 4 bytes, for example, and stores the delivery confirmation ID created by the ID issuance module 271 of the application execution part 27. The client information field 53 stores an IP address of a client machine 1, as client information, and includes an area 531 for storing its own field length (which is number of bytes).

The process flow of the above-mentioned software is explained, below. FIG. 6 is a flow chart showing the process performed in accordance with the browser 16 in the client machine 1. The process shown in FIG. 6 starts when the user of the client machine 1 executes the browser 16, and inputs an URL corresponding to an HTML document.

First, at step S101, the browser 16 requests the HTML document specified by the user input URL by sending out the URL to the WWW server 26 in the server machine 2. Then, the browser 16 receives the HTML document that is sent from the WWW server 26 in the server machine 2 in response. FIG. 7 schematically shows an example of such an HTML document.

At next step S102, the browser 16 analyses the received HTML document, and displays the content of the HTML document on the display part 14 of the client machine 1.

At the next step S103, the browser 16 determines whether the HTML document that has been analyzed and displayed at step S102 has an EMBED tag. When the HTML document contains an EMBED tag, the browser 16 advances the process to step S104. When the HTML document does not contain an EMBED tag, the browser 16 terminates the process. The HTML documents shown in the FIG. 7 includes an EMBED tag.

At the next step S104, the browser 16 requests plug-in data 40 corresponding to the file name specified by the EMBED tag to the WWW server 26 in the server machine 2. The browser 16 then receives the plug-in data 40 that is sent from the WWW server 26 in the server machine 2 in response. For example, the EMBED tag in the HTML document shown in FIG. 7 is written as <EMBED SRC= "foo.xxx">. Accordingly, in this case, the browser 16 requests and receives plug-in data 40 corresponding to the file name "foo.xxx". As described later, the plug-in data 40 to be used by the delivery confirmation processing of this preferred embodiment has a unique file name (which is, an identifier) having a predetermined extension (depending upon types of data).

At the next step S105, based on the extension of the file name of the plug-in data 40 received at step S104, the browser 16 executes plug-in software 17 that corresponds to that extension. After this step, the browser 16 terminates the process, and awaits further events.

FIG. 8 is a flow chart showing the process performed in accordance with plug-in software 17 in the client machine 1. The process shown in FIG. 8 is initiated when the browser 16 activates the plug-in software 17 as described above.

First, at step S111, the plug-in software 17 acquires the plug-in data 40 that have been received by the browser 16 at step S104 of FIG. 6.

At the next step S112, the plug-in software 17 decrypts the plug-in data 40, which had been encrypted by the plug-in data creation part 28, described later.

At the next step S113, the plug-in software 17 extracts a delivery confirmation ID, client information, and server information from the plug-in data 40 that have been decrypted at step S112.

At the next step S114, the plug-in software 17 connects to the server machine 2 based on the server information extracted at step S113. More specifically, based on the IP address of the server machine 2 and the specified port number at the server machine 2, which are included in the server information, the plug-in software 17 issues a socket function to connect to the server machine 2 through the port specified by the port number.

At the next step S115, the plug-in software 17 creates delivery confirmation data 50 based on the delivery confirmation ID and the client information, which have been obtained at step S113, and encrypts the data 50. Moreover, the plug-in software 17 sends the encrypted delivery confirmation data 50 to the port of the server machine 2 connected at step S114.

At the next step S116, plug-in software 17 waits for a response that should be sent from the server machine 2 as described later. Once receiving the response from the server machine 2, the plug-in software 17 terminates its process.

FIG. 9 is a flow chart showing the process performed by the application execution part 27 in the server machine 2. The process shown in FIG. 9 is activated by the WWW server 26 when the browser 16 requests an HTML document from the WWW server 26 in the server machine 2 at step S101 of FIG. 6.

First, at step S201, the application execution part 27 creates the HTML document that is requested by the browser 16.

At the next step S202, application execution part 27 instructs its ID issuance module 271 to issue a delivery confirmation ID. The ID issuance module 271 issues a unique delivery confirmation ID every time the application execution part 27 sends a corresponding request.

At the next step S203, application execution part 27 relates the HTML documents created at step S201 to the delivery confirmation ID issued at step S202. Here, the contents management module 272 operates independently of the application execution part 27. That is, the contents management module 272 continuously monitors whether the HTML document that has been related to the delivery confirmation ID is properly received by the client machine 1 without errors.

At the next step S204, the application execution part 27 calls the plug-in data creation part 28. At this time, the application execution part 27 sends the delivery confirmation ID obtained at step S202 and the client information to the plug-in data creation part 28. Then, the application execution part 27 acquires the file name of the plug-in data 40 that have been created by the plug-in data creation part 28 as explained later.

At the next step S205, the application execution part 27 sets an EMBED tag in the HTML document created at step S201. More specifically, the application execution part 27 inserts the file name of the plug-in data 40 acquired at step S204 in an EMBED tag. Through these steps, the HTML document, as shown in FIG. 7, for example, is completed.

At the next step S206, the application execution part 27 transmits the HTML document completed at step S205 to the browser 16 of the client machine 1 through the WWW server 26, and terminates the process. However, the contents management module 272 continues to monitor whether the HTML document sent by the application execution part 27 is properly received by the client machine 1 even after the termination of the process.

FIG. 10 is a flow chart showing the process performed by the plug-in data creation part 28 in the server machine 2.

The process shown FIG. 10 starts when the plug-in data creation part 28 is called by the application execution part 27 at step S204 of FIG. 9.

First, at step S211, the plug-in data creation part 28 acquires the delivery confirmation ID and the client information from the application execution part 27.

At the next step S212, the plug-in data creation part 28 creates server information, which is used when the plug-in software 17 in the client machine 1 transmits the delivery confirmation data 50 to the delivery confirmation receiving part 29 in the server machine 2 at step S115 of FIG. 8.

At the next step S213, the plug-in data creation part 28 generates plug-in data 40 from the delivery confirmation ID and the client information, which have been obtained at step S211, and from the server information obtained at step S212.

At the next step S214, the plug-in data creation part 28 encrypts the plug-in data 40 obtained at step S213.

The next step S215, plug-in data creation part 28 stores the plug-in data 40 encrypted at step S214 in a preset root directory of the WWW server 26 on the HDD 22 in the server machine 2. Here, the plug-in data creation part 28 adds a predetermined extension to the delivery confirmation ID so as to be the file name of the plug-in data 40. As a result, the plug-in data 40 is stored in the root directory of the WWW server 26 in the format of "(delivery confirmation ID).(extension)".

At the next step S216, the plug-in data creation part 28 sends the file name of the plug-in data 40 stored at step S215 to the application execution part 27. The file name is received by the application execution part 27 at step S204 of FIG. 9.

FIG. 11 is a flow chart showing the process performed by the delivery confirmation receiving part 29 in the server machine 2. The process shown in FIG. 11 starts when the server machine 2 is turned on.

First, at step S221, the delivery confirmation receiving part 29 issues a socket function with a specified port number of the server machine 2 so as to function as a server for receiving delivery confirmation data 50 from the plug-in software 17 in the client machine 1.

At the next step S222, the delivery confirmation receiving part 29 receives the delivery confirmation data 50, which have been sent from the plug-in software 17 in the client machine 1 at step S115 of FIG. 8.

At step S223, the delivery confirmation receiving part 29 decrypts the delivery confirmation data 50 received at step S222.

At the next step S224, the delivery confirmation receiving part 29 extracts the delivery confirmation ID and the client information from the delivery confirmation data 50 decrypted at step S223.

At the next step S225, the delivery confirmation receiving part 29 notifies the contents management module 272 of the delivery confirmation ID obtained at step S224.

At the next step S226, the delivery confirmation receiving part 29 sends a response to the corresponding client machine 1 in accordance with the client information, i.e., the IP address of the client machine 1 obtained at step S224. This response indicates that the delivery confirmation receiving part 29 received the delivery confirmation data 50 at step S222. This response is received by the plug-in software 17 in the client machine 1 at step S116 of the FIG. 8.

At the next step S227, the plug-in data contained in the root directory of the WWW server 26 is deleted, and the process returns to step S222.

The operation of the first embodiment is further explained, as follows. In order to retrieve a desired HTML document, a user of a client machine 1 specifies a URL corresponding to the desired HTML document through operating the input part 13 in the client machine 1. The browser 16 in the client machine 1 then sends out the URL specified by the user to the WWW server 26 in the server machine 2 (S101). The WWW server 26 of the server machine 2 receives this URL, and activates the application execution part 27 in order to retrieve the HTML document specified by the URL.

Thus activated application execution part 27 creates the corresponding HTML document (S201). At this stage, the file name in the EMBED tag in the HTML documents has not yet been set. Then, the application execution part 27 instructs its ID issuance module 271 to issue a delivery confirmation ID (S202).

Moreover, the application execution part 27 relates the delivery confirmation ID to the HTML document (S203). Thereafter, the contents management module 272 continues to monitor whether the HTML document related to that delivery confirmation ID is properly received by the client machine 1 without errors based on the issued delivery confirmation ID.

Then, the application execution part 27 calls the plug-in data creation part 28 (S204). At this time, the application execution part 27 sends the delivery confirmation ID and the client information to the plug-in data creation part 28.

Thus called plug-in data creation part 28 acquires the delivery confirmation ID and the client information from the application execution part 27 (S211). Further, the plug-in data creation part 28 creates server information (S212), and generates plug-in data 40 from the delivery confirmation ID, the client information and the server information (S213). The plug-in data creation part 28 encrypts the plug-in data 40 (S214). The plug-in data creation part 28 then stores the encrypted plug-in data 40 in a root directory of the WWW server 26 with its file name which is generated from the delivery confirmation ID and an appropriate extension (S215). Moreover, the plug-in data creation part 28 sends out this file name to the application execution part 27 (S216).

The application execution part 27 receives the file name from the plug-in data creation part 28 (S204), and sets it in an EMBED tag in the HTML documents (S205). The application execution part 27 then transmits thus created HTML document to the browser 16 in the client machine 1 through the WWW server 26 (S206).

The browser 16 receives this HTML document (S101), analyzes the HTML document, and displays it on the display part 14 in the client machine 1 (S102). Moreover, the browser 16 determines whether the HTML document contains an EMBED tag (S103). If an EMBED tag is found, the browser 16 requests plug-in data 40 having a file name specified by the EMBED tag to the WWW server 26 in the server machine 2. In response, the WWW server 26 sends out the plug-in data 40 stored in its root directory to the browser 16 in the client machine 1. The browser 16 receives this plug-in data 40 (S104). The browser 16 then activates plug-in software 17 in accordance with the extension of the file name of the plug-in data 40 thus received (S105).

The activated plug-in software 17 acquires the plug-in data 40 from the browser 16 (S111), and decrypts the plug-in data 40 (S112). The plug-in software 17 extracts the delivery confirmation ID, the client information, and the server information from the decrypted plug-in data 40 (S113). Then, the plug-in software 17 connects to a specified port of the server machine 2 in accordance with the server information (S114). Moreover, the plug-in software 17 generates delivery confirmation data 50 from the delivery confirmation ID and client information, and encrypts the data 50. Then, the plug-in software 17 transmits the encrypted delivery confirmation data 50 to the specified port of the server machine 2 (S115).

The delivery confirmation receiving part 29 in the corresponding server machine 2 receives the delivery confirmation data 50 sent to the specified port of the server machine 2 by the plug-in software 17(S222), and decrypts the received delivery confirmation data 50 (S223). The delivery confirmation receiving part 29 acquires the delivery confirmation ID and the client information from the decrypted delivery confirmation data 50. The delivery confirmation receiving part 29 notifies the contents management module 272 of the delivery confirmation ID thus obtained (S225).

Upon receipt of the notification, the contents management module 272 recognizes that the HTML document related to the delivery confirmation ID has been properly received by the client machine 1 without problems.

Then, the delivery confirmation receiving part 29 returns a response to the plug-in software 17 in the corresponding client machine 1 in accordance with the client information (S226), and deletes the corresponding plug-in data 40 from the root directory of the WWW server 26 (S227). On the other hand, the plug-in software 17 in the client machine 1 terminates its process when it receives the response from the delivery confirmation receiving part 29 in the server machine 2 (S116).

As described above, the server machine 2 is always monitoring, with the contents management module 272, whether the HTML documents sent from itself have been properly received by the client machine 1. Therefore, the server machine 2 can confirm receipt of an HTML document when the document is properly received by the client machine 1.

Accordingly, a manager of the server machine 2 is able to know whether an HTML document sent out is properly received at the intended client machine 1 by accessing the server machine 2.

Also, by encrypting the plug-in data 40 and the delivery confirmation data 50, the data 40 and 50 are protected from hacking and other undesired alternation and intrusion, thereby providing a highly reliable contents delivery system.

Moreover, the TCP/IP protocol is used for transmitting the delivery confirmation data 50. Therefore, its communication environment does not need a special setting, and general communication environments, such as a LAN, Internet and the like, can be used for the contents delivery system.

Although, in this preferred embodiment, the IP address of the client machine 1 is used as the client information, the machine name of the client machine 1 may be used as the client information instead. Instead of using the IP address of the server machine 2 as the server information, the machine name of the server machine 2 may be used as the server information.

Also, the scheme of the above-mentioned preferred embodiment may be applied to order processing for electrical commerce. In this case, when a user of the client machine 1 orders a product of which information is offered by the server machine 2, the server machine 2 creates an HTML document indicating that the order is completed, and sends out the HTML document to the client machine 1. The client machine 1 then automatically sends out delivery confirmation data 50 to the server machine 2 using its plug-in software 17. The server machine 2 receives the delivery confirmation data 50. Accordingly, without awaiting any operations by the user of client machine 1, the server machine 2 can confirm a proper receipt of the HTML document, which indicates the completion of the order, at the client machine side.

Second Preferred Embodiment

The second embodiment of present invention is to prepare for a situation where a user of a client machine 7 requests various kinds of digital contents, such as images, voices, characters, to a server machine 8. The client machine 7 and the server machine 8 of this second embodiment have the same hardware structures as those of the client machine 1 and the server machine 2 of the first preferred embodiment. The software structures of the client machine 7 and the server machine 8 are explained as follows.

FIG. 12 is a software structure of the client machine 7 according to the present preferred embodiment. The software installed in this client machine 7 includes an operating system (OS) (not shown in the figure), a WWW browser 76 to be executed on the OS (referred to as "browser" for simplicity hereinafter), and plug-in software 77.

Based on the HTTP protocol operating on the TCP/IP protocol, the browser 76 can communicate with a WWW server 86 (which will be explained later) in the server machine 8. The browser 76 has the following functions of requesting digital contents D designated by a user to the server machine 8, of receiving delivery contents T including the digital contents D, which are sent from the server machine 8 in response, and of activating the plug-in software 77.

The plug-in software 77 has a function of separating the digital contents D and plug-in data 40 from the delivery contents T. The plug-in software 77 also has a function of issuing a socket function, which is used for communicating with the server machine 8 in accordance with the TCP/IP protocol. The plug-in software 77 further has a function of sending out delivery confirmation data 50 using the corresponding socket function, and also has a function of receiving a response from the server machine 8.

Next, the software structure of the server machine 8 is explained with reference to FIG. 13. The software of this server machine 8 includes an OS (not shown in the figure), a WWW server 86 to be executed on the OS, a digital contents execution part 87, a plug-in data creation part 88, and a delivery confirmation receiving part 89. Moreover, the software in the server machine 8 includes the digital contents D.

Based on the HTTP protocol operated on the TCP/IP protocol, the WWW server 86 can communicate with the browser 76 in the client machine 7.

The digital contents execution part 87 has an ID issuance-processing module 871, which issues a unique delivery confirmation ID for each of the digital contents D to be sent to the client machine 7. The digital contents execution part 87 also has a contents management module 872, which manages delivery of the digital contents D sent to the client machine 7. This digital contents execution part 87 corresponds to a plug-in data transmission part.

The plug-in data creation part 88 creates plug-in data 40. The delivery confirmation receiving part 89 has a function of issuing a socket function, which is used for communicating with the client machine 7, and also has a function of receiving delivery confirmation data 50 using the socket function.

Here, the plug-in data 40 and the delivery confirmation data 50 used in this embodiment are similar to those in the first embodiment. Also, as explained later in detail, the plug-in data 40 are sent to the client machine 7 from the server machine 8 as a part of the delivery contents T that includes digital contents D. The delivery contents T are schematically shown in FIG. 14.

The flow of the process performed by the above-mentioned software is explained as follows. FIG. 15 is a flow chart showing the process performed by the browser 76 in the client machine 7. The process shown in FIG. 15 starts when the user of the client machine 7 activates the browser 76, and instructs the browser 76 to retrieve desired digital contents from the server machine 8.

First, at step S701, the browser 76 requests the WWW server 86 in the server machine 8 to download the digital contents specified by the user. The browser 76 receives the delivery contents T that have been sent from the digital contents execution part 87 in the server machine 8 through the WWW server 86. Thus received delivery contents T are created by the digital contents execution part 87 (this creation will be explained in detail later).

At the next step S702, in accordance with the extension of the file name of the received delivery contents T, the browser 76 activates plug-in software 77, which corresponds to that extension. The browser 76 then terminates the process, and awaits further events.

FIG. 16 is a flow chart showing steps performed by the plug-in software 77 at the client machine 7. The process shown in FIG. 16 starts when the browser 76 launches the plug-in software 77 at step S702 of FIG. 15.

First, at step S711, the plug-in software 77 acquires from the browser 76 the delivery contents T that have been received by the browser 76 at step S701 of FIG. 15.

At the next step S712, the plug-in software 77 separates plug-in data 40 and digital contents D from the thus acquired delivery contents T. The plug-in software 77 then decrypts the separated plug-in data 40.

At the next step S713, the plug-in software 77 attaches an appropriate file name to the digital contents D, which have been obtained in step S712, and stores the file in an HDD (not shown in the figure) of the client machine 7.

At the next step S714, the plug-in software 77 extracts a delivery confirmation ID, client information, and server information from the plug-in data 40 obtained at step S712.

At the next step S715, the plug-in software 77 connects to the server machine 8 based on the server information extracted at step S714. More specifically, based on an IP address and a specified port number of the server machine 8 which are included in the server information, the plug-in software 77 issues a socket function in order to connect to a port of the corresponding server machine 8 that is specified by the port number.

At the next step S716, the plug-in software 77 generates delivery confirmation data 50 from the delivery confirmation ID and the client information, which have been extracted at step S714, and encrypts the thus generated delivery confirmation data 50. The plug-in software 77 then transmits the encrypted delivery confirmation data 50 to the port of the server machine 8 connected at step S714.

At the next step S717, the plug-in software 77 waits for a response that is sent from the server machine 8 (the response by the server machine 8 will be described in detail below). Upon receipt of the response from the server machine 8, the plug-in software 77 terminates its process.

FIG. 17 is a flow chart showing the process performed by the digital contents execution part 87 in the server machine 8. The process shown in FIG. 17 is made to start by the WWW server 86 when the browser 76 requests digital contents to the WWW server 86 in the server machine 8 at step S701 of FIG. 15.

First, at step S801, the digital contents execution part 87 instructs its ID issuance module 871 to issue a delivery confirmation ID. The ID issuance module 871 issues a unique delivery confirmation ID every time it is requested by the digital contents execution part 87.

At the next step S802, the digital contents execution part 87 relates the delivery confirmation ID issued at step S801 to particular digital contents D that are specified by the user among the digital contents D stored in an HDD (not shown in the figure) of the server machine 8. Here, the contents management module 872 operates independently of the digital contents execution part 87. More specifically, the contents management module 872 continues to monitor whether the digital contents D related to the delivery confirmation ID are properly received by the client machine 7 without errors.

At the next step S803, the digital contents execution part 87 calls the plug-in data creation part 88. The digital contents execution part 87 sends the delivery confirmation ID and the client information obtained at step S801 to the plug-in data creation part 88. The digital contents execution part 87 then receives plug-in data 40, which are created by the plug-in data creation part 88 in response (the creation of the plug-in data 40 will be explained below).

At the next step S804, the digital contents execution part 87 creates delivery contents T by merging the plug-in data 40 received at step S803 with the data contents D. The digital contents execution part 87 then transmits thus created delivery contents T to the browser 76 in the client machine 7 through the WWW server 86, and terminates its process. However, the contents management module 872 continues to monitor whether the delivery contents T sent from the digital contents execution part 87 are properly received by the client machine 7 even after the termination of the process.

FIG. 18 is a flow chart showing the process performed by the plug-in data creation part 88 in the server machine 8. The process shown in FIG. 18 starts when the digital contents execution part 87 calls the plug-in data creation part 88 at step S803 of the FIG. 17.

First, at step S811, the plug-in data creation part 88 acquires the delivery confirmation ID and the client information from the digital contents execution part 87.

At the next step S812, the plug-in data creation part 88 creates server information, which is used when the client software 77 in the client machine 7 transmits delivery confirmation data 50 to the delivery confirmation receiving part 89 in the server machine 8 at step S716 of FIG. 16.

At the next step S813, the plug-in data creation part 88 generates plug-in data 50 from the delivery confirmation ID and the client information, which have been obtained at step S811, and from the server information created at step S812.

At step S814, the plug-in data creation part 88 encrypts the plug-in data obtained at step S813.

At the next step S815, the plug-in data creation part 88 sends the plug-in data 50 encrypted at step S814 to the digital contents execution part 87.

FIG. 19 is a flow chart showing the process performed by the delivery confirmation receiving part 89 in the server machine 8. The process shown in FIG. 19 starts when the server machine 8 is turned on.

First, at step S821, the delivery confirmation receiving part 89 issues a socket function with a specified port number of the server machine 8 so as to function as a server for receiving delivery confirmation data 50 from the plug-in software 77 in the client machine 7.

At the next step S822, the delivery confirmation receiving part 89 receives the delivery confirmation data 50, which have been sent from the plug-in software 77 in the client machine 7 at step S716 of FIG. 16.

At the next step S823, the delivery confirmation receiving part 89 decrypts the delivery confirmation data 50 received at step S822.

At step S824, the delivery confirmation receiving part 89 extracts the delivery confirmation ID and the client information from the delivery confirmation data 50 decrypted at step S823.

At the next step S825, the delivery confirmation receiving part 89 notifies the contents management module 872 of the delivery confirmation ID obtained at step S824.

At the next step S826, the delivery confirmation receiving part 89 returns a response to the corresponding client machine 7 based on the client information, i.e., the IP address of the client machine 7 obtained at step S824. This response indicates that the delivery confirmation receiving part 89 receives the delivery confirmation data 50 at step S822. This response is received by the plug-in software 77 in the client machine 7 at step S717 of the FIG. 16. Once transmitting the response, the delivery confirmation receiving part 89 returns its process to the step S822.

The operation of the second embodiment is further explained as follows. In order to retrieve desired digital contents, a user of the client machine 7 specifies the digital contents by operating an input part (not shown in the figure) of the client machine 7. The browser 76 in the client machine 7 requests the thus specified digital contents D to the WWW server 86 in the server machine 8 (S701). In response, the WWW server 86 in the server machine 8 activates the digital contents execution part 87 in the server machine 8. The activated digital contents execution part 87 instructs its ID issuance module 871 to issue a delivery confirmation ID (S801).

Moreover, the digital contents execution part 87 relates the thus issued delivery confirmation ID to the digital contents D specified by the user among a plurality of digital contents D stored in advance in an HDD (not shown in the figure) of the server machine 8 (S802). Thereafter, based on the issued delivery confirmation ID, the contents management module 872 continues to monitor whether the digital contents D related to the corresponding delivery confirmation ID is properly received by the client machine 7.

Next, the digital contents execution part 87 calls the plug-in data creation part 88 (S803). At this time, the digital contents execution part 87 sends the delivery confirmation ID and client information to the plug-in data creation part 88.

The called plug-in data creation part 88 acquires the delivery confirmation ID and the client information from the digital contents execution part 87 (S811). Further, the plug-in data creation part 88 creates server information (S812), and generates plug-in data 40 from the delivery confirmation ID, the client information and the server information (S813). The plug-in data creation part 88 encrypts the plug-in data 40 (S814). The plug-in data creation part 88 sends the encrypted plug-in data 40 to the digital contents execution part 87 (S815).

The digital contents execution part 87 then receives the plug-in data 40 sent from the plug-in data creation part 88 (S803). The digital contents execution part 87 creates delivery contents T by merging the digital contents with the plug-in data 40, and sends the delivery contents T to the browser 76 in the client machine 7 through the WWW server 86 (S804).

The browser 76 receives the delivery contents T (S701), and activates the plug-in software 77 corresponding to the extension of the file name of the delivery contents T (S702).

The activated plug-in software 77 acquires the delivery contents T from the browser 76 (S711). The plug-in software 77 then separates the plug-in data 40 and the digital contents D from the obtained contents T, and decrypts the separated plug-in data 40 (S712). Moreover, the plug-in software 77 attaches a predetermined file name to the digital contents D, and stores the file in an HDD of the client machine 7, which is not shown in the figures (S713).

Also, the plug-in software 77 extracts the delivery confirmation ID, the client information and the server information from the decrypted plug-in data 40 (S714). The plug-in software 77 then connects to a specified port of the server machine 8 in accordance with the server information thus extracted (S715). Moreover, the plug-in software 77 generates delivery confirmation data 50 from the delivery confirmation ID and the client information, and encrypts the data 50. The plug-in software 77 then transmits the encrypted data 50 to the specified port of the server machine 8 (S716).

The delivery confirmation receiving part 89 in the server machine 8 receives the delivery confirmation data 50 sent to the specified port of the corresponding server machine 8 by the plug-in software 77(S822), and decrypts the delivery confirmation data 50 (S823). The delivery confirmation receiving part 89 then extracts the delivery confirmation ID and the client information from the decrypted delivery confirmation data 50 (S824). The delivery confirmation receiving part 89 notifies the contents management module 872 of the thus obtained delivery confirmation ID (S825). By receiving this notice, the contents management module 872 recognizes that the delivery contents T related to the corresponding delivery confirmation ID is properly received by the client machine 7.

The delivery confirmation receiving part 89 then returns a response to the plug-in software 77 in the client machine 7 in accordance with the client information (S826). On the other hand, the plug-in software 77 in the client machine 7 receives the response from the delivery confirmation receiving part 89 in the server machine 8 (S717), and terminates its process.

As described above, the server machine 8 is always monitoring, with the contents management module 872, with the contents management module 872, whether the delivery contents T sent from itself have been successfully received by the corresponding client machine 7. Therefore, the server machine 8 can confirm receipt of the delivery contents T when the delivery contents T actually are received by the client machine 7.

The above-described embodiments may be applied to various business transactions, such as order processing and approval operations, which are conducted in a company or other organizations.

According to the present invention, as constructed above, a server machine can confirm whether contents sent from the server machine are properly received by an intended client machine. In other words, the client machine automatically transmits delivery confirmation data (receipt confirmation) indicating the receipt of the contents to the server machine. Accordingly, the server machine can confirm the delivery (receipt) of the contents without any operations by the user at the client machine.

I claim:

1. A contents delivery system comprising a client machine that executes a client program capable of requesting delivery of contents and a server machine that has a storage for storing contents and executes a server program capable of transmitting the contents requested by the client machine to the client machine, said server machine further comprising:

an ID issuance part for issuing a delivery confirmation ID that is uniquely related to contents requested by the client machine every time contents are requested by the client machine;

a plug-in data creation part for creating plug-in data including said delivery confirmation ID, client information for uniquely specifying the client machine, and server information for uniquely specifying the server machine;

a plug-in data transmission part for transmitting said plug-in data including the delivery confirmation ID related to the contents that have been transmitted to said client machine, when said client machine requests said plug-in data from said server machine after receiving the contents; and a delivery confirmation receiving part for receiving delivery confirmation data transmitted from the client machine, and said client machine comprising:

a receiving part for receiving the content and the plug-in data transmitted by said server machine;

a delivery confirmation transmission part for creating delivery confirmation data that includes the delivery confirmation ID and the client information contained in said plug-in data, and transmitting said delivery confirmation data to said delivery confirmation receiving part of said server machine in accordance with the server information contained in said plug-in data.

2. The contents delivery system according to claim 1, wherein said plug-in data transmission part of said server machine embeds in said contents an identifier uniquely specifying the plug-in data having the delivery confirmation ID related to said contents in order to instruct the client program in said client machine that has received said contents to request said plug-in data to said server program in the server machine.

3. The contents delivery system according to claim 1, wherein said plug-in data creation part of said server machine encrypts the created plug-in data, and wherein said delivery confirmation transmission part of said client machine decrypts the plug-in data received by the client program.

4. The contents delivery system according to claim 1, wherein said delivery confirmation transmission part of said client machine encrypts the created delivery confirmation data, and wherein said delivery confirmation receiving part of said server machine decrypts the delivery confirmation data received.

5. A client machine configured to be connected to a server machine that has a storage for storing contents and executes a server program capable of transmitting, upon request, the contents to a requesting machine, the client machine being capable of requesting the server machine to deliver contents, comprising:

a requesting/receiving part for receiving the content from the server machine, and requesting from the server machine plug-in data including a delivery confirmation ID that is uniquely related to the contents, client information that uniquely identifies the requesting client machine and server information that uniquely identifies the server machine, after receiving the content;

a delivery confirmation transmission part for creating delivery confirmation data including the delivery confirmation ID and the client information, and transmitting the delivery confirmation data to said server machine in accordance with the server information included in said plug-in data.

6. A server machine configured to be connected to a client machine that executes a client program capable of requesting delivery of contents, said server machine having a storage for storing contents and executing a server program for transmitting the contents requested by the client machine to the client machine, comprising:

an ID issuance part for issuing a delivery confirmation ID that is uniquely related to the contents requested by the client machine every time contents are requested by the client machine;

a plug-in data creation part for creating plug-in data including said delivery confirmation ID, client information for uniquely specifying the client machine, and server information for uniquely specifying the server machine;

a plug-in data transmission part for transmitting said plug-in data including the delivery confirmation ID related to the contents that have been transmitted to said client machine, when said client machine requests said plug-in data from said server machine after receiving the contents; and a delivery confirmation receiving part for receiving delivery confirmation data transmitted from said client machine, said delivery confirmation data including said delivery confirmation ID and said client information.

7. The server machine according to claim 6, further comprising a contents management part for confirming that the contents related to the delivery confirmation ID have been received by the client machine by acquiring said delivery confirmation ID from the delivery confirmation data received by said delivery confirmation receiving part.

8. A computer readable medium storing a program to be read by a client machine connected to a server machine, the server machine having a storage for storing contents and executing a server program capable of transmitting, upon request, the contents to a requesting machine, the client machine being capable of requesting the server machine to deliver contents, said program making the client machine execute the steps of:

receiving, when said server machine transmits to the client machine the contents;

requesting plug-in data including a delivery confirmation ID that is uniquely related to the contents, client information that uniquely identifies the requesting client machine and server information that uniquely identifies the server machine, upon receiving the content from the server machine;

creating delivery confirmation data including the delivery confirmation ID and the client information; and transmitting thus created delivery confirmation data to the server machine in accordance with the server information included in said plug-in data.

9. A computer readable medium storing a program to be read by a server machine connected to a client machine, the client machine executing a client program capable of requesting delivery of contents, the server machine having a storage for storing contents and executing a server program capable of transmitting the contents requested by the client machine to the client machine, said program making said server machine execute the steps of:

issuing a delivery confirmation ID that is uniquely related to the contents requested by the client machine every time contents are requested by the client machine;

creating plug-in data including said delivery: confirmation ID, client information and server information, said client information uniquely specifying the client machine, and the server information uniquely specifying the server machine;

transmitting said plug-in data including the delivery confirmation ID related to the contents that have been transmitted to said client machine by said server program when the client machine requests said plug-in data from the server machine upon receiving the contents; and receiving delivery confirmation data transmitted from said client machine, said delivery confirmation data including said delivery confirmation ID and said client information.

10. The computer readable medium according to claim 9, further storing a program causing said server machine to confirm that the contents related to the delivery confirmation ID have been received by the client machine by acquiring the delivery transmission ID included in said delivery confirmation data.

* * * * *

UNITED STATES PATENT AND TRADEMARK OFFICE
CERTIFICATE OF CORRECTION

PATENT NO. : 6,823,366 B1
DATED : November 23, 2004
INVENTOR(S) : Nakano

It is certified that error appears in the above-identified patent and that said Letters Patent is hereby corrected as shown below:

Title page,
Item [56], References Cited, U.S PATENT DOCUMENTS, "6,038,296" reference, please delete "3/2000" and insert -- 5/2000 --.

Column 18,
Line 1, delete "delivery:" and insert -- delivery --.

Signed and Sealed this

Twelfth Day of April, 2005

JON W. DUDAS
*Director of the United States Patent and Trademark Office*